United States Patent [19]
Boutaghou et al.

[11] Patent Number: 5,970,038
[45] Date of Patent: Oct. 19, 1999

[54] REDUCTION OF MESA FLY HEIGHT MODULATION DUE TO MEDIA ASPERITIES IN MAGNETO-OPTIC DRIVES

[75] Inventors: Zine-Eddine Boutaghou, Vadnais Heights; Mary Cynthia Hipwell, Minneapolis, both of Minn.

[73] Assignee: Seagate Technology, Inc., Scotts Valley, Calif.

[21] Appl. No.: 09/100,675

[22] Filed: Jun. 19, 1998

Related U.S. Application Data

[60] Provisional application No. 60/050,407, Jun. 20, 1997.

[51] Int. Cl.$^6$ .................................. G11B 7/00; G11B 5/60
[52] U.S. Cl. ..................... 369/112; 369/13; 369/44.15; 360/103; 360/104
[58] Field of Search ................ 369/13, 112, 44.22, 369/44.14, 44.15, 44.16; 360/103.75, 114, 104; 73/105; 384/12, 123

[56] References Cited

U.S. PATENT DOCUMENTS

| | | | |
|---|---|---|---|
| 4,777,544 | 10/1988 | Brown et al. | 360/75 |
| 5,295,122 | 3/1994 | Murakami et al. | 369/13 |
| 5,497,359 | 3/1996 | Mamin et al. | 369/44.15 |
| 5,557,488 | 9/1996 | Hamilton et al. | 360/104 |
| 5,685,645 | 11/1997 | Nepela et al. | 384/12 |
| 5,817,931 | 10/1998 | Boutaghou | 360/103 |
| 5,828,644 | 10/1998 | Gage et al. | 369/112 |
| 5,831,797 | 11/1998 | Schaenzer et al. | 369/13 |
| 5,847,902 | 12/1998 | Clifford, Jr. et al. | 360/104 |
| 5,856,896 | 1/1999 | Berg et al. | 360/104 |

*Primary Examiner*—John W. Cabeca
*Assistant Examiner*—Kim-Kwok Chu
*Attorney, Agent, or Firm*—Edward P. Heller, III; Raghunath S. Minisandram

[57] ABSTRACT

A magneto-optical head assembly that includes two load points. The two load points are laterally disposed from and longitudinally aligned with the center of the magneto-optical transducer carried on the head assembly. When contact between the head assembly and an asperity on the disc surface causes vibration of the head assembly in the pitch axis of the head assembly, the vibration is centered closely on the magneto-optical transducer, thus minimizing read/write signal modulation.

3 Claims, 4 Drawing Sheets

REDUCTION OF MESA FLY HEIGHT MODULATION DUE TO MEDIA ASPERITIES IN MAGNETO-OPTIC DRIVES

CROSS REFERENCE TO RELATED APPLICATIONS

This application claims the benefit of U.S. Provisional App. Ser. No. 60/050,407, filed Jun. 20, 1997.

FIELD OF THE INVENTION

This invention relates generally to the field of magneto-optic disc drive data storage devices, and more particularly, but not by way of limitation, to an improved magneto-optical head assembly which minimizes or eliminates the modulation of data read/write signals brought about by contact between the head assembly and asperities in the surface of the magneto-optical disc.

BACKGROUND OF THE INVENTION

Magneto-optical disc drive data storage devices, or magneto-optical drives, are well known in the industry. Such devices utilize a combination of electromagnetic and optical light technologies to store and retrieve data on the surface of appropriately designed plastic discs.

Evolutionary advances in the disc media and read/write heads have lead to the present generation of magneto-optical disc drives which are capable of storing large amounts of data on one side of a single disc. In order to achieve such data capacities, the magneto-optical transducers used to record and retrieve data are incorporated in self-acting hydrodynamic head assemblies that fly above the discs on a thin layer of air dragged along by the spinning disc. Head assemblies of the current generation typically fly at heights above the disc that bring the operative component of the magneto-optical transducer to within approximately 4 microinches (0.000004 inch) of the media surface.

"The magneto-optical head assembly is commonly mounted to an actuator which is capable of controllably moving the head assembly to any desired one of a plurality of data tracks on the disc surface. The most common type of actuator currently in use is a rotary type which includes a pivot shaft located near the outer periphery of the disc and extending normal to the plane of disc rotation. An actuator body is mounted to the pivot shaft via an arrangement of precision ball bearings. One side of the actuator body is connected to a motor which provides the motive force necessary to rotate the actuator body, and a second side of the actuator body provides a mounting system for attaching the rotatable actuator body to the magneto-optical head assembly, as well as a system of lenses or fiber-optic elements for directing light to and from the magneto-optical transducer on the head assembly.

As mentioned above, the head assembly typically includes an arrangement of self-acting hydrodynamic air bearing surfaces which interact with a thin layer of air dragged along by the surface of the spinning disc. The interaction between the air bearing surfaces of the head assembly and the spinning disc produces a lifting force which tends to lift the head assembly away from the disc surface.

It is well known in the industry to mount the head assembly to the actuator body via a head suspension, commonly formed of a thin, flexible stainless steel foil. Besides providing a physical mounting apparatus for the head assembly, the head suspension also typically includes a spring portion, a rigid beam portion and a gimbal portion. The head assembly is mounted to the gimbal portion, which also provides compliance in the roll and pitch axes of the head assembly, to allow the head assembly to follow minor variations in the surface of the disc. The spring portion of the head suspension produces a load force used to balance the hydrodynamic lifting force of the air bearing surfaces of the head assembly. This load force is transferred from the spring portion to the gimbal portion—and thus to the head assembly—by the rigid beam portion of the head suspension.

It is also common to localize the application of the load force to the head assembly by providing a precisely located feature on the gimbal portion of the head suspension, such as a stamped dimple. The exact location at which the load force is applied to the head assembly is referred to as the load point, and this load point is typically selected in relationship to the overall head assembly to act in cooperation with the air bearing surfaces of the head assembly and cause the head assembly to fly at a desired attitude in relationship to the disc surface."

While improvements to the surface quality of magneto-optical discs are being made, typical magneto-optical discs of the current generation still include media defects, or asperities, that are large enough to cause direct contact between the head assembly and the disc. Such contacts can result in excitation and vibration of the head assembly, which can lead in turn to uncontrolled variations in the spacing between the data transducer in the head assembly and the disc surface. Spacing variations of this type can produce undesirable modulation of the read/write signals and degradation of the data recording and/or recovery capability of the disc drive.

A need clearly exists, therefore, for a magneto-optical head assembly which can withstand contact with disc asperities without being subject to vibration-induced read/write signal modulation.

SUMMARY OF THE INVENTION

The present invention is a magneto-optical head assembly that includes two load points. The two load points are laterally disposed from and longitudinally aligned with the center of the magneto-optical transducer carried on the head assembly. When contact between the head assembly and an asperity on the disc surface causes vibration of the head assembly in the pitch axis of the head assembly, the vibration is centered closely on the magneto-optical transducer, thus minimizing read/write signal modulation.

It is an object of the invention to provide a magneto-optical head assembly for writing data to and reading data from the surface of a magneto-optical disc.

It is another object of the invention to provide a magneto-optical head assembly which minimizes read/write signal modulation caused by contact between the head assembly and asperities in the surface of a magneto-optical disc.

It is another object of the invention to provide a magneto-optical head assembly that is simple and economical to manufacture.

The manner in which the present invention achieves these objects, as well as other features and benefits of the invention, can best be understood by a review of the following Detailed Description of the Invention, when read in conjunction with and examination of the accompanying drawings.

DETAILED DESCRIPTION OF THE INVENTION

Figure 1:
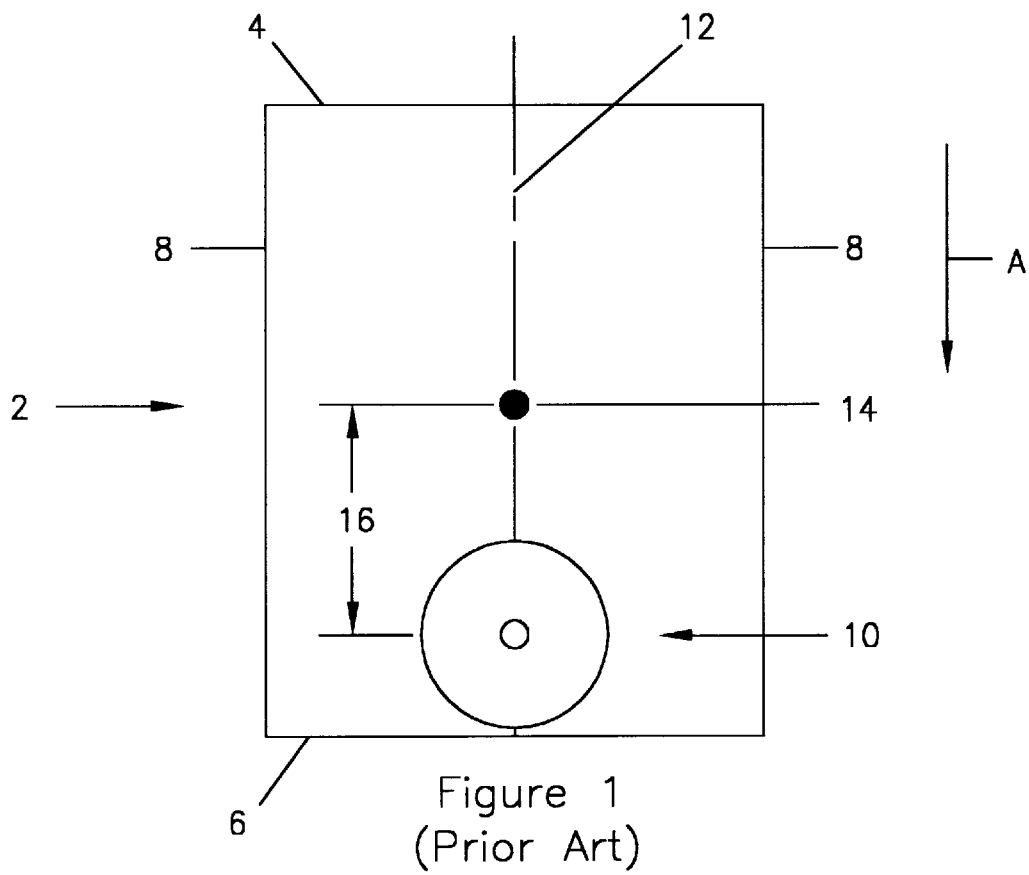
FIG. 1 is a simplified top plan view of a typical prior art magneto-optical head assembly.

Turning now to the drawings, and specifically to FIG. 1, shown is a simplified top plan view of a typical prior art magneto-optical head assembly 2. The direction of disc motion relative to the head assembly 2 is shown by arrow "A", and thus the head assembly 2 has a leading edge 4, a trailing edge 6 and two lateral edges 8. The magneto-optical read/write transducer is shown generally at 10 and can be seen to be laterally centered (centered on the longitudinal centerline 12 of the head assembly 2) and located closely adjacent the trailing edge 6.

The prior art magneto-optical head assembly 2 includes a single load point 14 which is also located substantially on the longitudinal centerline 12 of the head assembly 2. This load point 14 is longitudinally displaced from the center of the read/write transducer 10 by a distance represented by arrow 16, and the load point 14 is the location at which an associated head suspension (not shown) would exert a downward (toward the disc) load force. This relationship is perhaps best seen in FIG. 2.

Figure 2:
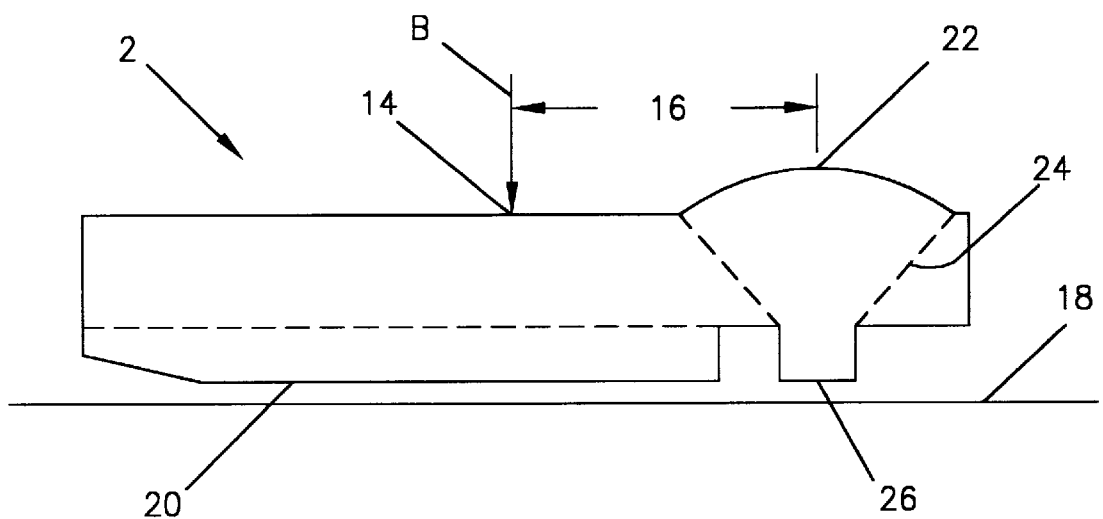
FIG. 2 is a simplified side elevation view of the prior art magneto-optical head assembly of FIG. 1 and an associated disc surface.

FIG. 2 is a simplified side elevation view of the prior art magneto-optical head assembly 2, showing the head assembly 2 in its intended cooperative relationship to a disc surface 18. As can be seen in the figure, the head assembly 2 is intended to fly above the disc surface 18, and this is facilitated by the inclusion in the head assembly 2 of a pair of laterally disposed side rails which further include air bearing surfaces (ABS) 20 which interact with a thin layer of air dragged along by the rotating disc to produce a hydrodynamic lifting force which is balanced by the downwardly directed load force, represented by arrow "B", at the load point 14 to maintain the head assembly in its intended operational relationship with the disc surface 18.

The magneto-optical transducer (10 in FIG. 1) can be seen in FIG. 2 to include a lens 22. Substantially all of the major components of the head assembly 2 are formed of a single piece of optically transparent material, such as zirconium, and the individual elements of the head assembly 2 are formed through the well known processes of etching, ion milling and precision lapping. The lens 22 serves to admit light from a light source (not shown) and focus the light within the area designated by dashed lines 24. The light is concentrated in a mesa 26, which is the portion of the transducer that interacts with the disc. Thus the general function of the air bearing 20 and load point 14 can be thought of as being to maintain the mesa 26 of the read/write transducer in the desired spatial relationship to the disc surface 18. As previously mentioned hereinabove, in magnetooptical disc drives of the current generation, the head assembly serves to maintain the mesa 26 at a flying height above the disc surface of approximately 4 microinches. Anything that acts to affect this desired spatial relationship would also act to cause undesirable modulation of the read/write signals applied by or received by the transducer.

Figure 3:
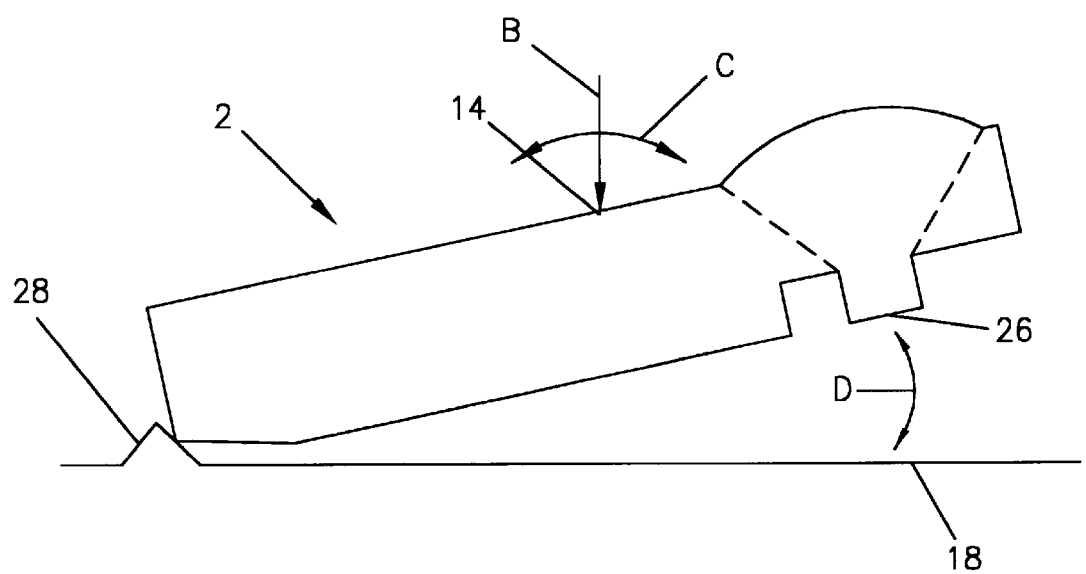
FIG. 3 is a diagrammatic representation of the response of the prior art magneto-optical head assembly of FIGS. 1 and 2 to contact with an asperity on the surface of a disc.

FIG. 3 is a simplified side elevation view showing the effect on the prior art magneto-optical head assembly 2 of contact with an asperity 28 on the disc surface 18. As can be seen in FIG. 3, contact between the head assembly and a disc asperity 28 will result in unintended variation in the pitch (i.e., fore and aft) attitude of the head assembly 2 in relationship to the disc. Since the load force, represented by arrow "B", from the head suspension (not shown) is applied at the load point 14, pitch variation results in rocking or vibration of the head assembly about the load point 14, as represented by arrow "C". Because the mesa 26 is longitudinally separated from the load point 14, the mesa 26 is subjected to proportional movement along arrow "D", and the extent of this movement is a direct function of the longitudinal separation, represented in FIGS. 1 and 2 by arrow 16, between the load point 14 and the center of the transducer (10 in FIG. 1). The amount of rotation of the head assembly 2 about the load point 14 has been greatly exaggerated in FIG. 3 for illustrative purposes, and mesa/disc separations of the magnitude shown in FIG. 3 would be expected to not merely introduce modulation into the read/write signals, but would in all likelihood render the transducer/disc interface inoperative for the duration of such separation. In actual magneto-optical disc drives of the current generation, the maximum extent of pitch movement of the head assembly 2 would be expected to be more on the order of 20 to 200 microradians resulting in mesa/disc separation variation ranging from a low of 0.2 microinches to a maximum of 2.0 microinches, and such a variation in mesa/disc separation would be expected to introduce undesirable amounts of read/write signal modulation, as well as introducing problems of focus loss, astigmatism and the possibility of inadvertently writing to a track adjacent to the intended track.

Figure 4:
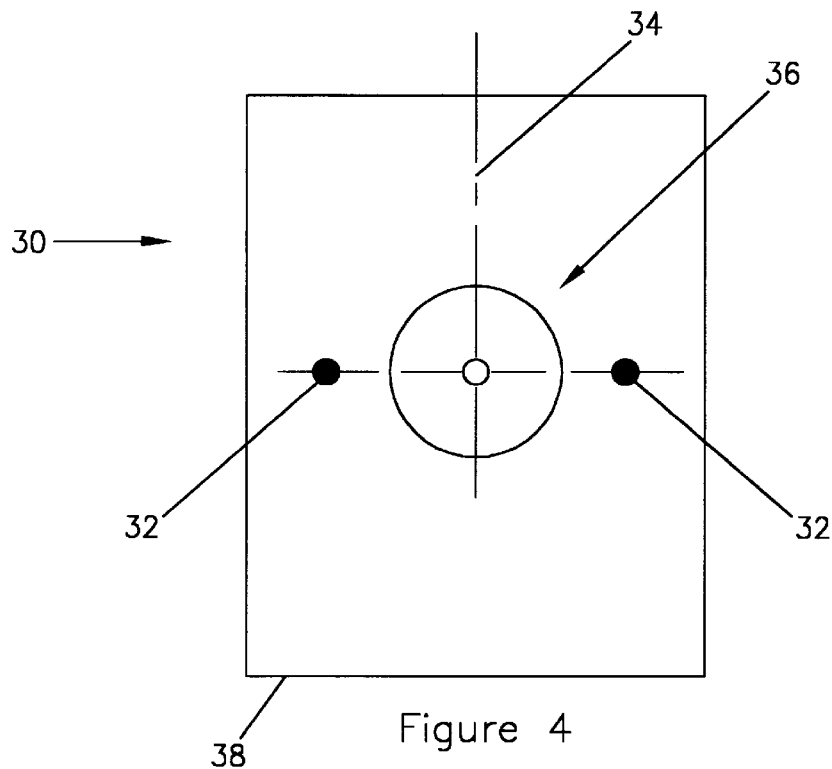
FIG. 4 is a simplified top plan view of a magneto-optical head assembly made in accordance with the present invention.

FIG. 4 is a simplified top plan view of a magneto-optical head assembly 30 made in accordance with the present invention. The head assembly includes two load points 32 located at positions laterally opposed about the longitudinal centerline 34 of the head assembly 30.

An comparison between the inventive head assembly 30 and the prior art head assembly 2 of FIGS. 1 through 3 reveals that the magneto-optical transducer, shown generally at 36, has been moved longitudinally away from the trailing edge 38 of the head assembly 30 to a position substantially between the two load points 32. Thus any induced pitch variation in the attitude of the head assembly 30 would be experienced as rotation about an axis running substantially through the load points 32 and the center of the read/write transducer 36.

Figure 5:
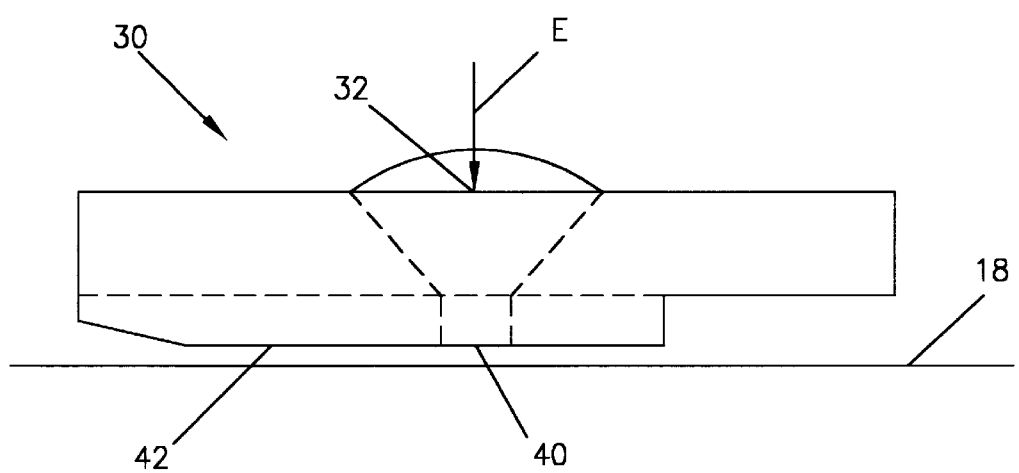
FIG. 5 is a simplified side elevation view of the magneto-optical head assembly of FIG. 4 in its operational relationship to a disc surface.

This relationship is also evident in FIG. 5, which is a simplified side elevation view of the inventive magneto-optical head assembly 30 of FIG. 4, shown in operational relation to a disc surface 18. FIG. 5 shows that the load force, represented by arrow "E", is applied to the load points 32 located substantially laterally opposite the center of the data transducer (36 in FIG. 4) and that the mesa 40 of the transducer is now located between the laterally opposed side rails forming the air bearing surfaces (ABS) 42 of the head assembly 30. During normal operation of the disc drive, the hydrodynamic lifting force provided by the ABS 42 serves to counter the load force E to the extent that the head assembly 30 flies above the disc surface 18 at a nominal flying height to maintain the mesa 40 at its intended spatial distance from the disc surface 18, in a manner similar to the prior art head assembly 2.

Figure 6:
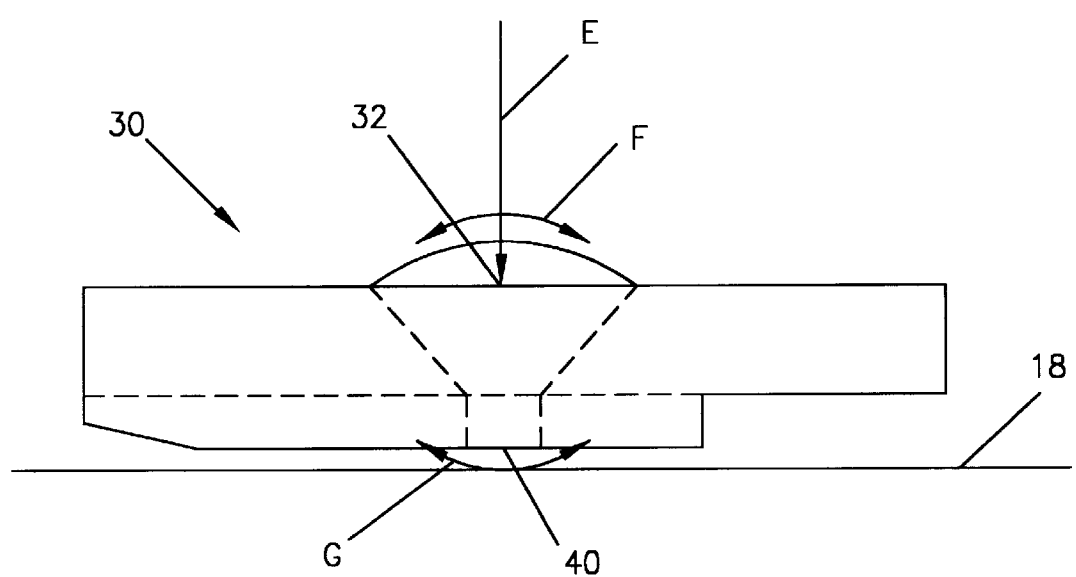
FIG. 6 is a diagrammatic representation of the response of a magneto-optical head made in accordance with the present invention to contact with an asperity on the surface of a disc.

The advantages and benefits of the inventive head assembly 30 can, perhaps, best be seen in FIG. 6, which is a simplified side elevation view of the inventive magnetooptical head assembly 30, again in normal operational relationship to a disc surface 18.

It will be evident to one of skill in the art that contact between the head assembly 30 and an asperity on the disc surface 18 will result in excitation of the head assembly 30 which causes rotation of the head assembly 30 about the axis formed by the load points 32, or along the direction of arrow "F". Such rotation of the head assembly 30 about the load points 32 will cause the mesa 40 to move in a proportional manner along the curve defined by arrow "G". A comparison of FIGS. 6 and 3 will show that the typical vertical excursion of the mesa 40 for any given amount of rotation of the head assembly about the load point is much less for the inventive head assembly 30 than for the prior art head assembly 2. When it is recalled that typical rotations of the head assembly due to contact with media asperities are within the range of 20 to 200 microradians, one of skill in the art will realize that the range of mesa/disc separation experienced by the head assembly 30 of the invention will be significantly less than that experienced by the prior art head assembly 2, as illustrated by FIG. 3, and thus the amount of read/write signal modulation, which is a direct function of the mesa/disc separation, will be proportionately lowered. In fact, since the amount of read/write signal modulation is directly proportional to the square of the amount of mesa/disc separation, it is expected that the amount of such read/write signal modulation induced in head assemblies of the present invention will be well within the range for which read/write electronics of the current generation are capable of compensating, and can, therefore, be considered negligible.

For reasons set forth hereinabove, the present invention provides a magnetooptical head assembly which is effectively insensitive to read/write signal modulation caused by pitch excitation of the head assembly caused by contact between the head assembly and media asperities.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiments, certain variations and modifications may be suggested to one of skill in the art upon reading this disclosure. Therefore, the scope of the present invention should be considered to be limited only by the following claims.

What is claimed is:

1. A magneto-optical head assembly for recording and retrieving data on a surface of a rotating magneto-optical disc comprising:

a slider assembly having an arrangement of air bearing surfaces acting to provide a hydrodynamic lifting force to the head assembly to fly the head assembly in an intended flying attitude in relationship to the disc;

a magneto-optical transducer located substantially on a longitudinal centerline of the slider assembly, and;

means for reducing signal modulation caused by pitch variation in the intended flying attitude due to contact between the head assembly and asperities on the surface of the disc.

2. A magneto-optical head assembly for recording and retrieving data on a surface of a rotating magneto-optical disc comprising:

a magneto-optical transducer, and a slider assembly, further comprising:

a longitudinal axis substantially parallel with a direction of rotation of the disc relative to the head assembly;

a lateral axis substantially perpendicular to the longitudinal axis and parallel to the surface of the disc;

a longitudinal centerline extending along the longitudinal axis of the slider assembly and substantially midway between lateral extremes of the slider assembly;

an arrangement of air bearing surfaces acting to provide a hydrodynamic lifting force to the head assembly;

two load points on an upper surface of the slider assembly, located at laterally opposed positions on opposite sides of the longitudinal centerline and substantially equally spaced from the longitudinal centerline, where a load force for balancing the lifting force is applied;

the magneto-optical transducer located substantially on the longitudinal centerline of the head assembly and substantially midway between the laterally opposed load points.

3. A magneto-optical head assembly for recording and retrieving data on a surface of a rotating magneto-optical disc comprising:

a magneto-optical transducer; and a slider assembly, further comprising:

a longitudinal axis substantially parallel with a direction of rotation of the disc relative to the head assembly;

a lateral axis substantially perpendicular to the longitudinal axis and parallel to the surface of the disc;

a longitudinal centerline parallel with the longitudinal axis and lying at a midpoint of the slider assembly along the lateral axis;

an arrangement of air bearing surfaces acting to provide a hydrodynamic lifting force to the head assembly;

two load points on an upper surface of the slider assembly, located at laterally opposed positions along and on opposite sides of the longitudinal centerline, where a load force for balancing the lifting force is applied;

the magneto-optical transducer located substantially on the longitudinal centerline of the head assembly and substantially midway between the laterally opposed load points.

* * * * *